United States Patent [19]

Takayanagi et al.

[11] Patent Number: 5,096,990
[45] Date of Patent: Mar. 17, 1992

[54] RESIN COMPOSITION FOR INNER COAT OF SEMICONDUCTOR CHIP

[75] Inventors: Kazuhiro Takayanagi; Masayuki Tsuchida; Atsushi Koshimura, all of Shizuoka; Nobumasa Ohtake; Tamio Kimura, both of Yokohama, all of Japan

[73] Assignees: Tomoegawa Paper Co., Ltd., Tokyo; Chisso Corporation, Osaka, both of Japan

[21] Appl. No.: 423,113

[22] Filed: Oct. 19, 1989

[30] Foreign Application Priority Data

Oct. 19, 1988 [JP] Japan .................. 63-261380

[51] Int. Cl.$^5$ ............................. C08G 77/06
[52] U.S. Cl. ............................. 528/15; 525/478; 528/31; 528/32
[58] Field of Search ............... 528/15, 31, 32; 525/478

[56] References Cited

U.S. PATENT DOCUMENTS 4,764,576  8/1988  Ogawa et al. .................. 528/15

Primary Examiner—Melvyn I. Marquis
Attorney, Agent, or Firm—Darby & Darby

[57] ABSTRACT

Resin compositions for the inner coat of semiconductors which include
(A) 100 parts by weight of a polysiloxane having vinyl groups and having a viscosity of 100 to 800cP at 25° C., said polysiloxane having a general formula

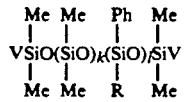

in which V represents a vinyl group, Me represents a methyl group, Ph represents a phenyl group, R represents a methyl group or a phenyl group and both k and l represent natural numbers which are variables within the range of $0.01 \leq l/(k+l) \leq 0.2$, (B) 1 to 35 parts by weight of a polysiloxane haivng a viscosity of 2 to 500cP at 25° C., said polysiloxane having a general formula

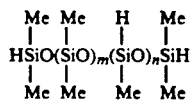

in which Me represents a methyl group, and both m and n represent natural numbers which are variables within the range of $0.05 \leq n/(m+n) \leq 0.3$, (C) 0.1 to 20% by weight of a organopolysiloxane per total amount of the above-described (A) plus (B), the organopolysiloxane having, per molecule, at least one hydrogen atom bound witha silicon atom and at least one group having the general formula $(R_1O)_3$-$SiCH_2CH_2$— in which $R_1$ represents a lower alkyl group or a group $R_2(OCH_2CH_2)_p$— in which $R_2$ represents a methyl group or an ethyl group and p represents a positive number of 3 or less, and (D) platinum catalyst for the addition reaction are provided.

8 Claims, 1 Drawing Sheet

RESIN COMPOSITION FOR INNER COAT OF SEMICONDUCTOR CHIP

BACKGROUND OF THE INVENTION

1. Field of the Invention

This invention relates to curable organopolysiloxane which can be used as a silicone inner coat for protecting the surface of semiconductor elements.

2. Description of Prior Art

By the term "inner coat" of the semiconductor is meant a protecting layer which is pre-coated on the surface of the semiconductor element in order to prevent the damages of the surface of the semiconductor from occurring during the molding of the semiconductor devices with a resin or those caused by the contractile stress generated upon curing of the resin on the semiconductor, or to protect the connection of the bonding wire.

FIG. 1 shows an example of the semiconductor device having the semiconductor element covered with the inner coat.

The semiconductor element 2 having a layer of the inner coat layer 1, which is bonded and fixed with a die bonding adhesive layer 4 onto a lead frame 3a which is used as the semiconductor substrate. Reference numerals 5 and 6 in FIG. 1 denote a bonding wire and a molding material, respectively. The bonding wire 5 is bonded with the semiconductor element 2 and the other lead flames 3b and 3c, and also they are molded in a molding material 6.

Since the surface of the semiconductor element and the surrounding area are processed minutely, they tend to receive various physical stresses such as one generated at the time of assembling transfer mold and the like or one generated as the result of the differences in the coefficient of thermal expansion in the semiconductor due to the change in the temperature in the inside thereof.

Furthermore, the aluminum wiring or the aluminum electrode of the semiconductor element is corroded by contaminants in the molding material, especially Cl ions, which are transported by water that enters into the interface between the molded material and the lead frame through the molding material and the like.

In general, a method is used in which a polyimide resin or a silicone resin is coated as a coating material on the surface of the semiconductor to protect it from the physical stresses and the corrosion, especially the silicone resin is useful for protecting the surface of the semiconductor element and absorbing the physical stresses generated from the surrounding area of the semiconductor element because the silicone resin has particularly low modulus of elasticity.

The protective layer can be formed on the surface of the semiconductor element by curing the silicone resin which is cured after quantitatively dropping it on the surface of the semiconductor element using a dispenser or the like. When the silicone resin is cured on the semiconductor element, the permeation of water from around the semiconductor element onto the surface thereof cannot be avoided because of the low tackiness between the silicone resin and the surface of the semiconductor element, gold wire and molding material. Thus, the aluminum wire or the aluminum electrode on the surface of the semiconductor element tend to be corroded by the impurities, especially Cl ions transported by water, which results in that the reliability of the semiconductor is reduced.

Accordingly, it has heretofore been proposed to improve the reliability of the semiconductor in general by the addition of an additive for improving adhesion strength which is so-called a tackifier into the silicone resin in order to improve the adhesion strength of the silicone resin with the semiconductor, gold wire, and molding material.

In general, the conventionally used tackifier, which includes silane-coupling agent, siloxane oligomer and the like, has a low molecular weight and a relatively low boiling point, so that it is easily volatilized and scattered over the surface of the semiconductor when the resin is heated for curing, thus contaminating the lead frame and the like.

When the lead frame is molded with a resin-type material such as an epoxide resin and the like, the adhesion strength between the lead frame and the molding material decreases once contamination of the lead frame occurs, causing permeation of water into the semiconductor element. For instance, when an examination is conducted under the limited temperature and humidity conditions, such as pressure cooker test under 121° C./2 atm abs., the reliability of the semiconductor element decreases due to remarkable permeation of the contaminated water from the interface between the lead frame and the molding material.

SUMMARY OF THE INVENTION

This invention has been done from the point of the above-described problems, and an object of this invention is to provide a curable organopolysiloxane composition which is useful as an inner coat for semiconductors characterized by the high adhesion strength and avoiding its volatilizing and scattering of compound having a low boiling points at the time of heat curing.

More particularly, the present invention provides a resin composition (I) for the inner coat of semiconductor chip of the invention, comprises (A) 100 parts by weight of a polysiloxane having vinyl groups and having a viscosity of 100 to 800 cP at 25° C., the polysiloxane having the general formula

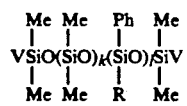

in which V represents a vinyl group, Me represents a methyl group, Ph represents a phenyl group, R represents a methyl group or a phenyl group, and both k and l represent natural numbers which are variables within the range of $$0.01 \leq l/(k+l) \leq 0.2,$$

(B) 1 to 35 parts of weight of a polysiloxane having the viscosity of 2 to 500 cP at 25° C., the polysiloxane having the general formula

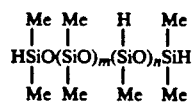

in which Me represents a methyl group, and both m and n represent natural numbers which are variables within the ranges of $$0.05 \leq n/(m+n) \leq 0.3,$$

(C) 0.1 to 20% by weight of a organopolysiloxane per total amount of the above-described (A) plus (B), the organopolysiloxane having, per molecule, at least one hydrogen atom bound with a silicon atom and at least one group having the general formula $(R_1O)_3SiCH_2CH_2-$ in which $R_1$ represents a lower alkyl group or a group $R_2(OCH_2CH_2)_p-$ in which $R_2$ represents a methyl group or an ethyl group and p represents a positive number of 3 or less, and (D) a platinum catalyst for the addition reaction.

In another aspect, the present invention provides a resin composition (II) for the inner coat of semiconductor chip of the invention, comprising (A) 100 parts by weight of a polysiloxane having vinyl groups and having a viscosity of 200 to 500 cp at 25° C., said polysiloxane having a general formula

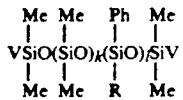

in which V represents a vinyl group, Me represents a methyl group, Ph represents a phenyl group, and both k and l represent natural numbers which are variables within the range of $0.03 \leq 1/(k+1) \leq 0.15$, (B) 5 to 25 parts by weight of a polysiloxane having the viscosity of 5 to 150 cP at 25° C., the polysiloxane having the general formula

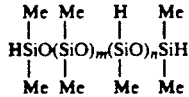

in which Me represents a methyl group, and both m and n represent natural numbers which are variable within the range of $0.1 \leq n/(m+n) \leq 0.2$, (C) 0.1 to 20% by weight of a organopolysiloxane per total amount of polysiloxane (A) plus polysiloxane (B), the organopolysiloxane having, per molecule, at least one hydrogen atom bound with a silicon atom and at least one group having the general formula $(R_1O)_3SiCH_2CH_2-$ in which $R_1$ represents a lower alkyl group or a group having the general formula $R_2(OCH_2CH_2)_p-$ in which $R_2$ represents a methyl group or an ethyl group and p represents a positive number of 3 or less, and (D) a platinum catalyst for the addition reaction.

According to the present invention, the reliability of the semiconductor is improved remarkably by the insignificant decrease in the weight at the heating; and the curing and high adhesion strength of the silicone resin for the electric materials to the semiconductor element, the wire and the molding material.

DETAILED DESCRIPTION OF THE INVENTION

Figure 1:
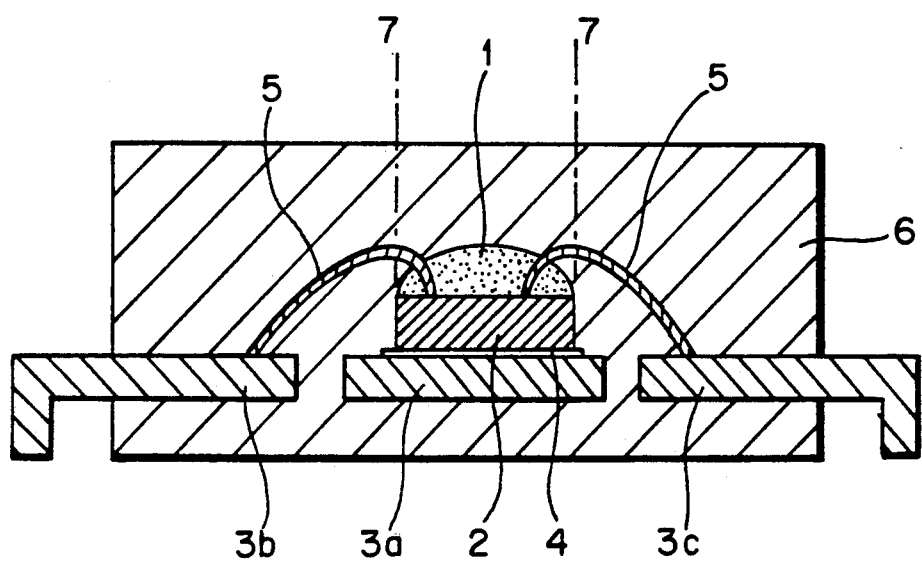
FIG. 1 shows a sectional view of the semiconductor having the inner coat embodying the invention.

A further detailed description concerned with the present invention will be given in the following description.

The ingredient (A) used in the composition includes a straight chain polysiloxane having vinyl groups bound to Si atoms only at the both terminals thereof. The polysiloxane must have a viscosity of 100 to 800 cP at 25° C. and the ratio of l to (k+l) is in the range of 0.01 to 0.2, wherein l represents mole of the PhRSiO unit (in which R represents a methyl group or a phenyl group) and k represents mole of the Me$_2$SiO unit.

In this case, the main chain portion of the ingredient (A) is composed of a copolymer obtained from the polymerization between the Me$_2$SiO unit and the PhRSiO unit, because the introduction of the phenyl group into the ingredient (A) improves the heat-resistance of the inner coat layer comprising the composition of the present invention, and therefore it is preferred that R represents a phenyl group in the PhRSiO unit.

The range of the l/(k+l) value of the ingredient (A) is from 0.01 to 0.2. When the l/(k+l) value is less than 0.01, desired heat-resistivity is not obtained. On the other hand, when the l/(k+l) value is more than 0.2, the compatibility of the ingredient (A) with the ingredient (B) which includes polysiloxane having hydrogen atoms bound with Si atoms decreases, with the result that the inner coat layer becomes milky muddy, although ingredient (A) can obtain sufficient heat-resistivity. More preferred range of the l/(k+l) is from 0.03 to 0.15.

Furthermore, the behavior in coating of the composition on the semiconductor element is affected by the viscosity of the composition. That is, when the viscosity of the composition is less than 100 cP at 25° C., the composition diffuses too fast over the surface of the semiconductor, and then the inner-coat layer becomes too thin. Therefore, the composition cannot cover enough around the bonding wire, so that the composition flows out from the surface of the element. On the other hand, when the viscosity of the composition is more than 800 cP, the composition diffuses poorly over the surface of the semiconductor, and then the inner coat layer does not have a desired thickness or it becomes difficult to coat the composition uniformly around the bonding wire.

The polysiloxane in the ingredient (B), which contains hydrogen atoms bound with silicon atoms, is a straight chain polysiloxane having hydrogen atoms bound with Si atoms at both terminals thereof. The polysiloxane acts as a curing agent on the polysiloxane having vinyl groups in the ingredient (A), which acts as a main agent. That is, the curing agent is responsible for hydrosilylation i.e., addition reaction of an Si—H bond to a vinyl group.

Furthermore, the polysiloxane must have a viscosity of 2 to 500 cP at 25° C. and the ratio of n to (m+n) equals the value of 0.05 to 0.3, in which n represents mole of the MeHSiO unit and m represents mole of the Me$_2$SiO unit in the general formula (B). The polysiloxane is used in the composition in proportion to 1 to 35 parts by weight of the polysiloxane per 100 parts by weight of the ingredient (A).

The above-described n/(m+n) value of 0.05 to 0.3, is preferable for the curing of the resin since when the n/(m+n) value is less than 0.05, the resin is impossible to cure completely, and on the other hand, when that value is more than 0.3, the curing of the resin proceeds too fast to form a layer with sufficient flexibility. The preferred range of n/(m+n) value is from 0.1 to 0.2. However, it is possible to prepare the resin which can be cured to a desired extent in spite of the n/(m+n) value being slightly out of the above-described preferable range by adjusting the respective viscosities of the ingredients (A) and (B) or the proportion of the ingredient (A) to the ingredient (B).

The viscosity of 2 to 500 cP at 25° C. is used to cure the resin. When the viscosity is less than 2 cP at 25° C., not only the initial viscosity of the compound is difficult to adjust to a desired value but also there occurs poor cured condition caused by polysiloxane having a low molecular weight. On the contrary, when the viscosity is above 500 cP, the initial viscosity of the compound is also difficult to adjust to a desired value. Preferably, the viscosity is in the range of 5 to 150 cP.

Furthermore, when the amount of polysiloxane used is less than one part by weight per 100 parts by weight of the ingredient (A), the inner coat layer tends to be cured imperfectly. On the contrary, when the amount of the polysiloxane used is more than 35 parts by weight, the stability and the electric characteristics of the cured resin are adversely affected by the reactive Si—H bounds which remain unreacted.

The polysiloxanes in the ingredients (A) and (B) can be produced by well-known process. For example, polysiloxane having vinyl groups used in the ingredient (A) can be produced as follows. That is, hexamethylcyclotrisiloxane or octamethylcyclotetrasiloxane is reacted with hexaphenylcyclotrisiloxane or trimethyltriphenylcyclotrisiloxane in the presence of an acidic catalyst such as sulfuric acid, hydrochloric acid, activated clay and the like, or alkaline catalyst such as potassium hydroxide, cesium hydroxide, tetramethylammonium hydroxide, lithium silanolate, potassium silanolate, lithium phenoxide or the like, and also in the presence of divinyltetramethyldisiloxane as a terminator to reach equilibrium, and thereafter the catalyst is removed from the equilibrated mixture by a conventional method, followed by subjecting the catalyst-removed equilibrated mixture to heat-treatment under reduced pressure to remove polysiloxane having low molecular weight, thus purifying the polysiloxane.

The polysiloxane in the ingredient (B) having silicon-bound hydrogen groups can be obtained by the same way as in the case of the above-described polysiloxane in the ingredient (A) except that tetramethyldisiloxane is used as the terminator and tetramethylcyclotetrasiloxane is employed in place of the cyclopolysiloxane having phenyl groups.

Furthermore, the amounts of phenyl groups or silicon-bound hydrogen atoms as well as the viscosity can be adjusted to desired values by assorting in a conventional manner the proportions of the starting materials in the above-described process for the purification of polysiloxane from the ingredient (A) or (B).

The ingredient (C) is a organopolysiloxane having, per molecule thereof, at least one H atom bound with silicon and at least one group having the general formula $(R_1O)_3SiCH_2CH_2-$ in which $R_1$ represents a lower alkyl group or $R_2(OCH_2CH_2)_p-$ in which $R_2$ represents a methyl group or an ethyl group and p represents a positive number of 3 or less. Also, the ingredient (C) occupies the composition of the present invention in the proportion of 0.1 to 20% by weight to total amount of the ingredient (A) plus the ingredient (B) for the improvement of the adhesion strength to the semiconductor chip. Furthermore, the ingredient (C) can be synthesized easily by adding the organic silicon compound having trialkoxysilyl groups to polyorganohydrogensiloxane in the presence of platinum catalyst. After that, the synthesized ingredient (C) has one of the following groups represented by $R_1$ and $R_2$ in the above-described formulae, for example, a methyl group, an ethyl group, a propyl group, an isopropyl group, a butyl group, or an isobutyl group.

The preferred amount of the organopolysiloxane used is in the range of 1 to 10% by weight per total amount of the ingredient (A) plus the ingredient (B). That is, when the amount of the organopolysiloxane used is less than 0.1% by weight per total amount of (A) plus (B), improvement of the above-described adhesion strength is not enough. On the contrary, when the amount of the organopolysilixane used is more than 20% by weight, marked improvement in the above-described adhesion strength is not accomplished and the stability and the electric characteristics of the cured-layer are adversely affected by the increased amount of SiOR₁ groups having a high reactivity.

The ingredient (D) which is a platinum catalyst for the addition reaction, includes all of the known catalysts useful for the addition reaction between a vinyl group and a silicon-bound hydrogen. Representative examples of the platinum catalysts include chloroplatinic acid, complex compound of chloroplatinic acid with an olefin or polysiloxane having vinyl groups and the like, and coordination compounds of platinum and the like. The amount of the platinum catalyst used is not limited specifically because the platinum catalyst only gives influence on the curing velocity depending on the thermal condition. However, the practical amount of the platinum catalyst is in the range of 2 to 6 ppm per total amount of the ingredient (A) plus (B). In this case, a compound which is known as a retarder for the addition reaction may be used together which coordinates platinum in the catalyst therearound to temporarily or reversibly inhibit the catalytic activity of platinum to the addition reaction. Also, an inorganic filler or a heat-resistant stabilizer may be added to the composition of the present invention as far as the inner coat of the semiconductor is not affected adversely.

In order to prepare the composition of the present invention all the components may be mixed at a time. However, one of the practical or general method for the mixing of the above-described ingredients is a mixing method so-called "two-part types", which is conducted by dividing the ingredients into two groups, mixing the ingredient of each group severally, and mixing one group of the mixed ingredients and other group of the mixed ingredients.

Thus, the above-described method is more available than mixing the ingredients at once.

However, in this case, the silicon-bound hydrogen has a high reactivity so that it is impossible to mix previously the polysiloxane having silicon-bound hydrogen atoms for the ingredient (B) with other ingredient than the polysiloxane having vinyl groups for the ingredient (A).

Accordingly, the organopolysiloxane for the ingredient (C) and the platinum catalyst of the ingredient (D) for the addition reaction are pre-mixed with the polysiloxane having vinyl groups for the ingredient (A), together with other ingredient, when necessary or desired, such as a retarder for the addition reaction, an inorganic filler, or a heat stabilizer.

Making a comparison between the resin composition (I) and resin composition (II), the range of the $l/(k+l)$ value will as a matter of course differ from the range of the $n/(m+n)$ value according to the slight differences in their chemical structures. However, the detailed explanation about the respective differences is omitted herein because the basic reasons for the differences and the blend ratio of (A), (B), (C) and (D) for the composition (II) will be obvious to one skilled in the art from the explanation on the composition (I).

To further illustrate this inventions, and not by way of limitation, the following examples are shown. Unless otherwise indicated specifically, all parts and percentages (%) are by weight, and viscosity values are those obtained at 25° C.

First of all, polysiloxane of the ingredient (C) was synthesized by the addition reaction in the presence of a platinum catalyst, i.e., by reacting polymethylhydrogensiloxane having 0.06% by weight of hydrogen atoms bound with silicon atoms and having a viscosity of 90 cP with the organic silicon compound described before in an amount of 0.06% by weight in terms of the content of the hydrogen atom, $C_1$: $CH_2=CHSi(OCH_3)_3$
$C_2$: $CH_2=CHSi(OC_2H_4OCH_3)_3$
$C_3$: $CH_2=CHSi[(OC_2H_4)_3OCH_3]_3$

EXAMPLE 1

First example of the procedure for fabricating the inner coat of the semiconductor using the resin composition of this invention is as follows.

That is, a resin composition for the inner coat was prepared by
(a) mixing
  (i) 100 parts of the mixed solution consisting of 100 parts of a straight-chain polysiloxane having vinyl groups at the both terminals thereof, which has a viscosity of 360 cP and an $l/(k+l)$ value of 0.06 in a ratio of moles of the ($Ph_2SiO$) unit to a total amount of l moles of the ($Ph_2SiO$) unit plus k moles of the ($Me_2SiO$) unit, 2 parts of a polysiloxane $C_1$, and chloroplatinic acid complex of methylvinylcyclopolysiloxane in an amount corresponding to a platinum content in the mixed solution of 4 ppm per unit weight of the above-mentioned straight-chain polysiloxane, with
  (ii) 18 parts of the other mixed solution consisting of 10 parts of a straight-chain polysiloxane having silicon-bound hydrogen atoms at the both terminals thereof, which has a viscosity of 87 cP and an $n/(m+n)$ value of 0.1 in a ratio of n moles of the (MeHSiO) unit to total amount of n moles of the (MeHSiO) unit plus m moles of the ($Me_2SiO$) unit, and 1 part of the above-described polysiloxane having vinyl group, followed by
(b) excluding bubbles generated in the above-described composition,
(c) dropping the bubble-free composition on the surface of the semiconductor element mounted with a 1M bit RAM, by using a dispenser, and
(d) subjecting the dropped composition to 3 hours of heat-treatment at 150° C. to cure it and then the inner coat was cured completely (compression modulus of elasticity was 0.3 kg/cm³), The reliability of the inner coat obtained by the above-described procedure was checked by the "pressure cooker test" under the condition of 121° C./2 atm abs. in 500 hours after molding the surface of the semiconductor having the above-described inner coat with epoxide resin.

As the result, it was confirmed that no corrosion occurred in the pad and circuit portion of the semiconductor element and the semiconductor device had high reliability. After molding, the package was opened at the opening plane 7 shown in FIG. 1 and the molding material 6 and the semiconductor element 2 were peeled off in order to check the adhesion strength of the silicone resin with the molding material. It was confirmed that the inner coat layer 1 composed of the silicone resin showed cohesive failure, which corresponded to high adhesion strength between the silicone resin and the molding material.

EXAMPLE 2

Second example of the procedure for fabricating the inner coat of the semiconductor using the resin composition of this invention is as follows.

That is, a resin composition for the inner coat was prepared by
(a) mixing
  (i) 100 parts of the mixed solution consisting of 100 parts of a straight-chain polysiloxane consisting vinyl groups at the both terminals thereof, which has a viscosity of 370 cP and a $l/(k+l)$ value of 0.06 in a ratio of l moles of the ($Ph_2SiO$) unit to a total amount of moles of the ($Ph_2SiO$) unit plus k moles of the ($Me_2SiO$) unit, 2 parts of a denatured polysiloxane $C_2$ and chloroplatinic acid complex of methylvinylcyclopolysiloxane in an amount corresponding to a platinum content in the mixed solution of 4 ppm per unit weight of the above-mentioned straight-chain polysiloxane, with
  (ii) 18 parts of the other mixed solution consisting of 10 parts of a straight-chain polysiloxane having silicon-bound hydrogen atoms at the both terminals thereof, which has a viscosity of 90 cP and an $n/(m+n)$ value of 0.1 in a ratio of n moles of the (MeHSiO) unit to total amount of n moles of the (MeHSiO) unit plus m moles of the ($Me_2SiO$) unit, and 1 part of the above-described polysiloxane having vinyl group followed by
(b) excluding bubbles generated in the above-described composition,
(c) dropping the bubble-free composition on the surface of the semiconductor element mounted with 1M bit RAM, by using a dispenser, and
(d) subjecting the dropped composition to 3 hours of heat-treatment at 150° C. to cure thereof and then the inner coat was cured completely (compression modulus of elasticity was 0.4 kg/cm³).

The reliability of the inner coat obtained by the above-described procedure was checked by the "pressure cooker test" under the condition of 121° C./2 atm abs. in 500 hours after molding the surface of the semiconductor having the above-described inner coat with epoxide resin.

As the result, it was confirmed that no corrosion occurred in the pad and circuit portion of the semiconductor element and the semiconductor device had high reliability. After molding, the package was opened at the opening plane 7 shown in FIG. 1 and the molding material 6 and the semiconductor element 2 were peeled off in order to check the adhesion strength of the silicone resin with the molding material. It was confirmed that the inner coat layer 1 composed of the silicone resin showed cohesive failure, which corresponded to high adhesion strength between the silicone resin and the molding material.

COMPARATIVE EXAMPLE

For comparing the above-described examples with the conventional procedure, comparative control steps as follows.

First, a resin composition for the inner coat was obtained by (a) mixing
   (i) 100 parts of a mixed solution consisting of 100 parts of the straight-chain polysiloxane having vinyl groups at the both terminals thereof, which has a viscosity of 360 cP and the value of 0.06 in the ratio of l moles of the (Ph₂SiO) unit to total amount of l moles of the (Ph₂SiO) unit plus k moles of the (Me₂SiO) unit, with 0.4% of vinyltris (2-methoxyethoxy)silane, and chloroplatinic acid complex of methylvinylcyclopolysiloxane in an amount corresponding to a platinum content in the mixed solution of 4 ppm per unit weight of the above-mentioned straight-chain polysiloxane, with
   (ii) 18 parts of the other mixed solution consisting of 10 parts of a straight-chain polysiloxane having vinyl groups at the both terminals thereof, which has a viscosity of 90 cP and the value of 0.1 in the ratio of n moles of the (MeHSiO) unit to total amount of n moles of the (MeHSiO) unit plus m moles of the (Me₂SiO) unit, and 1 part of the above-described polysiloxane having vinyl group, followed by (b) excluding bubbles generated in the above-described composition, (c) dropping the bubble-free composition on the surface of the semiconductor element mounted with a 1M RAM, by using a dispenser, and (d) subjecting the dropped composition with 3 hours of the heat-treatment at 150° C. to cure it and then the inner coat was completed by curing the composition. (compression modulus of elasticity was 0.3 kg/cm³), The reliability of the inner coat obtained by the above-described procedure was checked from the point of water resistibility of the semiconductor device in the same way as in "Example 1" after molding the semiconductor with the resin, and then the results indicated that the reliability of the semiconductor element was defected by the corrosion which was detected on the pad and the circuit portion of the semiconductor element.

After the above-described test, the adhesion strength between the lead frame and the molding material was measured, and then the result indicated that the adhesion strength was only 42% of the adhesion strength concerned with polysiloxane of the present invention.

Also, the adhesion strength of the control was tested by peel off the molding material 6 from the semiconductor element 2 at the opening plane 7 described in FIG. 1 after molding the package, and it was confirmed that peeling took place readily at the interface between the molding material and the silicone resin. The results of the test indicated the adhesion strength of the control was lower than that of the molding material containing the polysiloxane used in the present invention.

What is claimed is:

1. A resin composition for the inner coat of semiconductor comprising (A) 100 parts by weight of a polysiloxane having vinyl groups and having a viscosity of 100 to 800 cP at 25° C., said polysiloxane having a general formula

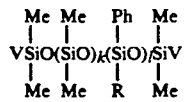

in which V represents a vinyl group, Me represents a methyl group, Ph represents a phenyl group, R represents a methyl group or a phenyl group and both k and l represent natural numbers which are variables within the range of $0.01 \leq l/(k+l) \leq 0.2$, (B) 1 to 35 parts by weight of a polysiloxane having a viscosity of 2 to 500 cP at 25° C., said polysiloxane having a general formula

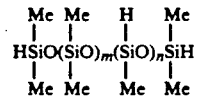

in which Me represents a methyl group, and both m and n represent natural numbers which are variables within the range of $0.05 \leq n/(m+n) \leq 0.3$, (C) 0.1 to 20% by weight of an organopolysiloxane per total amount of the above-described (A) plus (B), said organopolysiloxane having, per molecule, at least one hydrogen atom bound with a silicon atom and at least one group having the general formula (R₁O)₃SiCH₂CH₂— in which R₁ represents a lower alkyl group or a group R₂(OCH₂CH₂)ₚ— in which R₂ represents a methyl group or an ethyl group and p represents a positive number of 3 or less, and (D) a platinum catalyst for the addition reaction.

2. A resin composition for the inner coat of semiconductor as described in the claim 1, wherein said polysiloxane (A) has the viscosity of 200 to 500 cP at 25° C. and the polysiloxane (B) has the viscosity of 5 to 150 cP at 25° C.

3. A resin composition for the inner coat of semiconductor as described in claim 1, wherein said polysiloxane (A) has the l/(k+l) value of 0.03 to 0.15.

4. A resin composition for the inner coat of semiconductor as described in claim 1, wherein said polysiloxane (B) has the n/(m+n) value of 0.1 to 0.2.

5. A resin composition for the inner coat of semiconductor as described in claim 1, wherein said composition comprises 5 to 25 parts by weight of the polysiloxane (B) per 100 parts by weight of the polysiloxane (A).

6. A resin composition for the inner coat of semiconductor as described in claim 1, wherein said composition comprises polysiloxane (A) having phenyl groups represented by R in the general formula thereof.

7. A resin composition for the inner coat of semiconductor as described in claim 1, wherein said composition comprises 1 to 10% by weight of the denatured organopolysiloxane (C) per total amount of (A) plus (B).

8. A resin composition for the inner coat of semiconductors comprising (A) 100 parts by weight of a polysiloxane having vinyl groups and having a viscosity of 200 to 500 cP at 25° C., said polysiloxane having a general formula

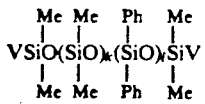

in which V represents a vinyl group, Me represents a methyl group, Ph represents a phenyl group, and both k and l represent natural numbers which are variables within the range of $0.03 \leq l/(k+l) \leq 0.15$, (B) 5 to 25 parts of weight of a polysiloxane having the viscosity of 5 to 150 cP at 25° C., said polysiloxane having the general formula

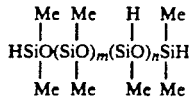

in which Me represents a methyl group, and both m and n represent natural numbers which are variable within the range of $0.1 \leq n/(m+n) \leq 0.2$, (C) 0.1 to 20% by weight of an organopolysiloxane per total amount of polysiloxane in (A) plus polysiloxane (B), said organopolysiloxane having, per molecule, at least one hydrogen atom bound with a silicon atom and at least one group having the general formula $(R_1O)_3-SiCH_2CH_2-$ in which $R_1$ represent a lower alkyl group or a group having the general formula $R_2(OCH_2CH_2)_p-$ in which $R_2$ represents a methyl group or an ethyl group and p represents a positive number of 3 or less, and (D) a platinum catalyst for the addition reaction.

* * * * *